United States Patent [19]

Hollwedel, Jr. et al.

[11] 3,741,645
[45] June 26, 1973

[54] PHOTO-ELECTRONIC FILM TRANSPORT

[75] Inventors: Henry C. Hollwedel, Jr., Belmont; Donald R. Allan, Menlo Park, both of Calif.

[73] Assignee: George Lithograph Company, San Francisco, Calif.

[22] Filed: Nov. 4, 1971

[21] Appl. No.: 195,699

[52] U.S. Cl. .................... 355/41, 353/26, 355/50, 355/64
[51] Int. Cl. .................................. G03b 27/52
[58] Field of Search .................. 355/41, 43, 50, 51, 355/64; 353/25, 26

[56] References Cited
UNITED STATES PATENTS

| | | | |
|---|---|---|---|
| 3,267,800 | 8/1966 | Baillod | 355/41 |
| 3,377,914 | 4/1968 | Jeffee | 355/41 |
| 3,353,441 | 11/1967 | Jonker | 355/41 |

Primary Examiner—Samuel S. Matthews
Assistant Examiner—Richard A. Wintercorn
Attorney—Julian Caplan

[57] ABSTRACT

Film, such as microfilm, is moved through an apertured frame positioned between an exposure beam (e.g. enlarger lamp) and sensitized paper or other object to be exposed. The edge of the film is pre-marked with locating spots which interrupt light from a source on one side of the film to a photocell on the opposite side. The light interruption controls operation of a motor which drives the film. Preferably there are two consecutive lights and photocells, the first causing the motor to slow and, through clutches to vary the gear ratio, and the second stopping the film accurately located relative to the frame aperture. Means is also provided to move the photocells toward and away from the film edge to sense different channels of locating spots and other means to adjust timing and positioning by moving the photocells short distances longitudinally of the film.

6 Claims, 8 Drawing Figures

INVENTOR.
Henry C. Hollwedel Jr.
Donald R. Allan
By Julian Caplan
Attorney

INVENTOR.
Henry C. Hollwedel Jr.
Donald R. Allan
By Julian Caplan
Attorney

PHOTO-ELECTRONIC FILM TRANSPORT

This invention relates to a new and improved photocell control for a film trsnsport. More particularly, the invention relates to a control for a micro-film, or similar film, transport used in making electrostatic plates and prints, all as disclosed in application Ser. No. 18,421 filed Mar. 11, 1970, now U.S. Pat. No. 3,634,006, and for similar purposes.

A particular feature of the present invention is the provision of means for accurately positioning film relative to an aperture through which a selected frame of the film is exposed. Thus, registration of the frame with the print or plate to be produced is obtained automatically and with extreme accuracy.

Another feature of the invention is the provision of a photocell control which is actuated by locating spots which are positioned on the film near one of its longitudinal edges. Such spots are sensed by a photocell and the motor which drives the transport is controlled thereby.

Another feature of the invention is the provision of a motor for driving the transport which is reversible and has a gear reduction drive from said motor to the film driving means which has a high-speed and low-speed movement, depending on the motor direction. One-direction clutches located in the gear drive cause the transport to operate in one direction at high speed and in the opposite direction at low speed, but there is no actual meshing and un-meshing of gears required to accomplish the change in speed. Thus a photocell senses the spot located adjacent the film edge to first change the direction of rotation of the motor from its high speed direction to slow speed direction and a second photocell stops the film transport in precise position during the time it is in slow speed direction.

Another feature of the invention is the provision of spots on the film at a plurality of different distances from the edge, which distances constitute a plurality of channels. The photocell may be adjusted in position so that it senses spots located in any one of the channels.

A further feature of the invention is the provision of means for moving the photocells longitudinally of the path the film travels so as to adjust the timing of the transport control.

Another feature of the invention is the provision of rapid means for installing and removing the film.

Still another feature of the invention is the fact that the device interprets binary dots or spots on the film to control the number of copies made.

Any material — silver base, diazo, thermo-vesicular can be used, either positive or negative appearing.

Still further, the film advance is fast but the film speed is slow when the image is about to be centered at the exposure station, thus increasing the accuracy of the positioning of the film frame. All exposure is made while the film is stopped and accurately positioned, allowing maximum resolution in the reproduction.

Other objects of the present invention will become apparent upon reading the following specification and referring to the accompanying drawings in which similar characters of reference represent corresponding parts in each of the several views.

The transport of the present invention is embodied in a main frame 11 which is adapted for installation in enlarger-type equipment so as to drive a film, such as a micro-film, from an input reel to a takeup reel, locating selected frames on the film in such position that they are exposed by an exposure lamp onto an electrostatic copier to make a plate or print. A machine for producing plates or prints from micro-film is shown in copending application Ser. No. 18,421 filed Mar. 11, 1970. The present invention may be incorporated in such a machine or in other machines.

Figure 1:
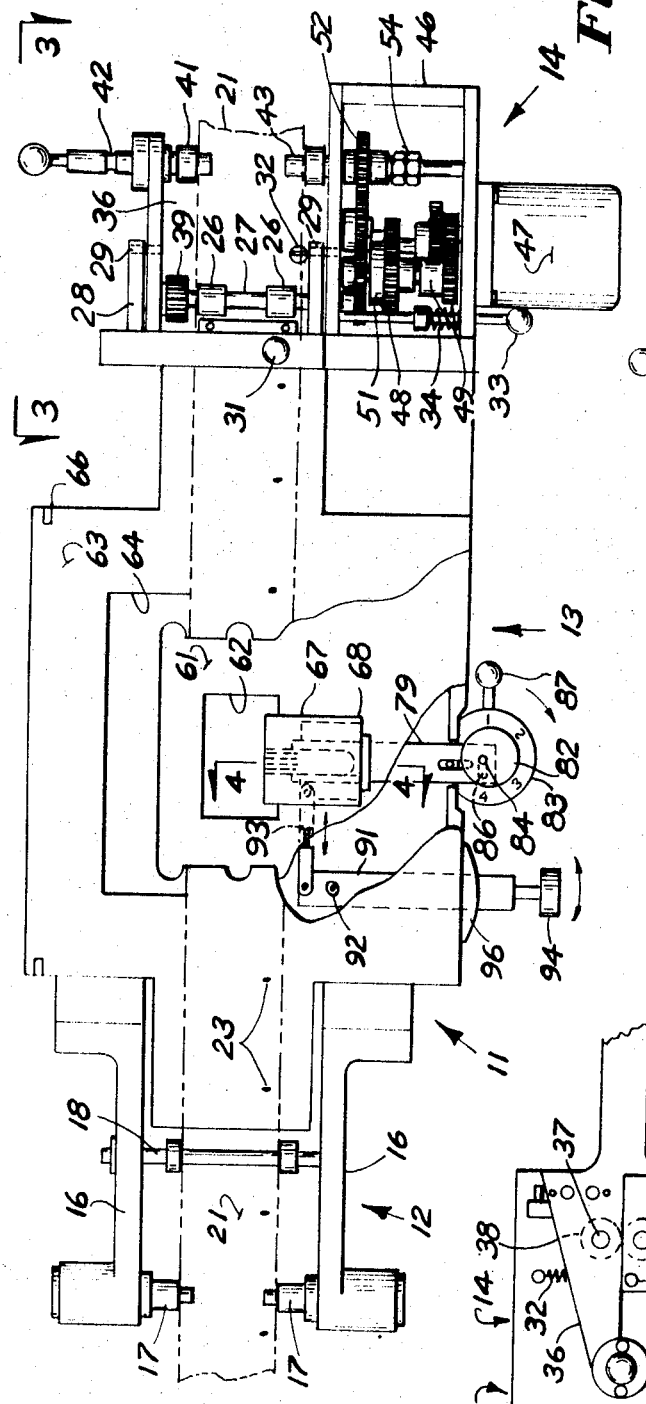
FIG. 1 is a top plan view of a transport in accordance with the present invention, partly broken away to reveal internal construction.

At the left end of the main frame 11, as viewed in FIG. 1, is an input film support section 12, at the middle is an exposure section 13, and at the right is takeup section 14. The film moves from a reel (not shown) mounted in section 12 through exposure section 13 to a takeup reel (not shown) on section 14.

Figure 7:
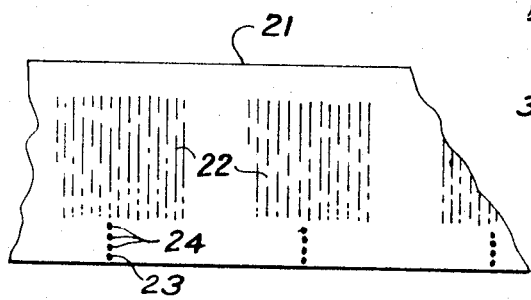
FIG. 7 is an enlarged view of a portion of micro-film of the type which may be used with the present invention.
Figure 5:
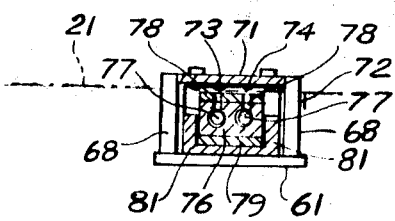
FIG. 5 is a sectional view taken substantially along the line 5—5 of FIG. 4.

Directing attention first to the input film support section 12, a pair of arms 16 extend to the left and have reel engaging spindles 17 which engage the input film reel (not shown) in a manner well understood in this art. The film from the reel is guided by one or more rotary film guides 18 which are spaced to accommodate the width of the film 21 which is being handled. Film 21, as best shown in FIG. 7, has a plurality of spaced frames 22 of printed or graphic material. The film 21 may or may not have sprocket holes. In the form shown in FIG. 7, no sprocket holes are illustrated but it will be understood that the present equipment operates satisfactorily with sprocket-hole type film. Adjacent one marginal edge of film 21 opposite the middle of each frame 22 is at least one locating spot 23. When spot 23 is accurately located relative to the exposure head of an enlarger in which the transport is installed, frame 22 is centered relative to the optical axis of the lens (not shown) used in the exposure head. One of the features of the present invention is that additional spots 24 may be located laterally of spot 23. As shown in FIG. 7 there are four channels of spots. It will be understood that the spots may be staggered. In other words, a spot 23 may be located opposite one of the frames 22 but not opposite other frames and the next innermost channel of spots may be blank opposite certain frames and positioned opposite other frames. As will hereinafter appear, the transport control is adjusted to sense spots only in one selected channel and to disregard spots in other channels, and hence certain frames 22 may be selected for exposure and other frames not exposed depending upon the positioning of spots 23, 24.

Figure 2:
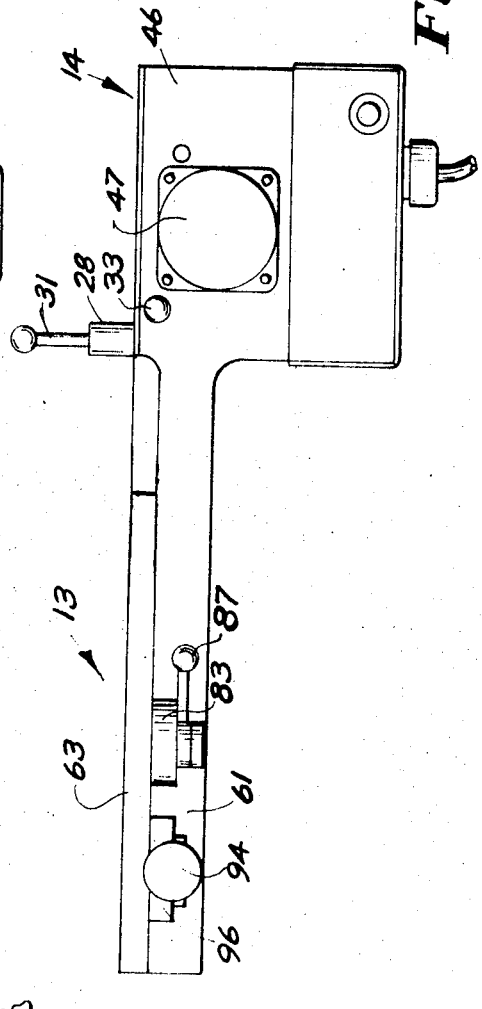
FIG. 2 is a side elevation of a portion of the structure of FIG. 1.
Figure 3:
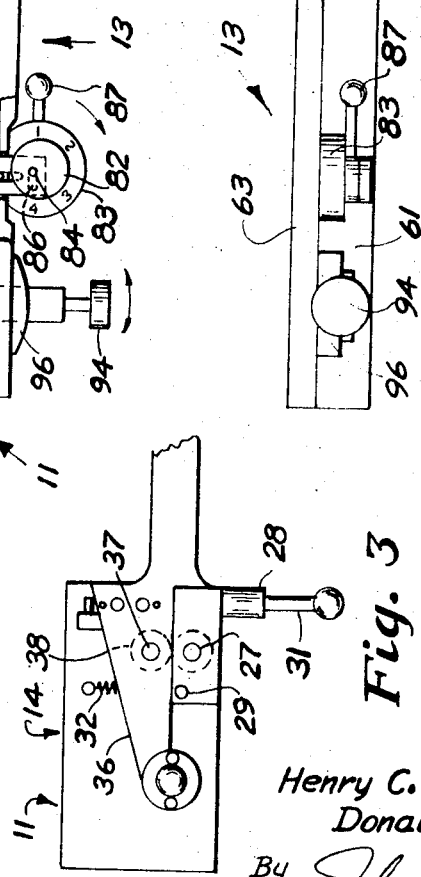
FIG. 3 is a fragmentary elevational view taken substantially along the line 3—3 of FIG. 1.

Directing attention now to the output film support section 14, upper film rollers 26 engage the top of film 21 and are rotated by transverse horizontal upper shaft 27 which is rotatably mounted in yoke 28. Yoke 28 is supported on horizontal axis pivot 29 by gearbox 46 and arm 36. Lift lever 31 attached to yoke 28 is used to pivot yoke 28 clockwise as viewed in FIG. 2 about its pivot point 29. Spring 32 biases the yoke 28 counterclockwise. When it is necessary to change film, the lift lever 31 is pivoted to the right as viewed in FIG. 3 so as to release pressure of the rollers 26 on the film. A horizontal slidable latch 33 mounted in the upper film support section 14 is biased by spring 34 to engage yoke 28 and to hold the yoke in operative position and latch 33 is retracted when lever 31 is lifted.

A longitudinal horizontal extending lower arm 36 is mounted on the back of section 14 (the upper end of FIG. 1). A lower shaft 37 is rotatably mounted in arm 36 and in the casing of gearbox 46 and carries lower film rollers 38 which correspond in spacing to the rollers 26. The film 21 is thus gripped between the rollers 26 and 38. Gears 39 on shafts 27, 37 drive the shafts in opposite directions at the same speed.

Mounted on the outer end of arm 36 is takeup spindle 41 which cooperates with spindle 43 to support the takeup reel (not shown). Retractor 42 is used to retract spindle 42 when it is necessary to remove the takeup reel, whereas spindle 43 on the gearbox 46 is non-retractable.

Figure 6:
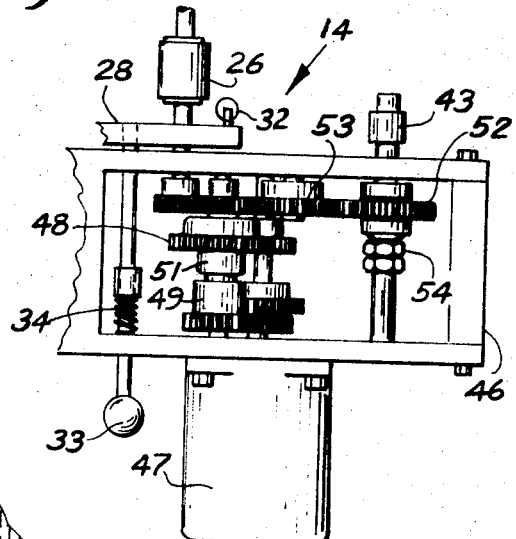
FIG. 6 is an enlarged fragmentary plan view showing a portion of the gear drive.

Gearbox 46 has mounted on the exterior thereof a motor 47 which is preferably reversible. The shaft of motor 47 extends inside the gearbox 46 and a plurality of gears 48 are mounted within the box 46, said gears accomplishing a speed reduction between the shaft of motor 47 and the shaft 37. One direction clutches 49, 51 are mounted on some of the shafts supporting the gears within gearbox 46. As hereinafter appears, the motor 47 is driven by its electronic control in either of two directions. In one direction of rotation, the gear ratio is such that the shaft 37 is driven at relatively high speed. When the motor 47 is reversed in direction, the clutches 49, 51 disengage and the gears in box 46 accomplish speed reduction. FIG. 6 illustrates the manner in which the speed reduction is accomplished. Spindle 43 is mounted on a shaft which also carries takeup gear 52 which meshes with an idler 53 which engages one of the gears driving shaft 37. A slip clutch 54 biases gear 52 to turn with spindle 43 but permits slippage. Such a slip clutch arrangement is conventional in takeup reels where the varying amount of film on a takeup reel requires rotation of the reel at different speeds.

Directing attention now to the exposure section 13, a light-proof lower holder 61 is provided formed with an aperture 62 which is slightly larger than the size of a frame 22 to be exposed. Hinged to the lower holder 61 is an upper holder 63 which also has an aperture 64 which may be considerably larger than the aperture 62. Film 21 passes between holders 61 and 63 in conventional guides and the control of this invention has as its primary purpose to stop a selected frame 22 in registry with aperture 62 for exposure from a light source immediately above frame 11. Hinges 66 mount the upper holder 63 on the lower holder 61 in a manner to permit detachment of the upper holder when required and convenient opening of the holder when film is being changed.

Lamp holder 67 is fixed to the top side of holder 61 with its inner end over the path of travel of film 21. In registry with holder 67 is photocell carrier 71 hinged thereto by means of hinge 72, which has an axis which is horizontal and parallel to the direction of movement of the film. There are two photocells 73, 74 in carrier 71, for a purpose which hereinafter appears.

Lamp holder 67 has a plurality of lamp carriers 76 carrying lamps 77 which illuminate the edge of film 21 through apertures 78 and is in other respects light proof. The assembly of lamp carrier 76 and photocell carrier 71 is mounted on a slide 79 which slides transversely, horizontally in a guide 81 which is formed in lower holder 61. A round eccentric 82 is rotatable within an eccentric housing 83 on the side of the machine and the eccentric 82 carries a connector 84 which extends into a slot 86 in slide 79. Handle 87 is used to turn eccentric 82 within its housing 83 and as the handle is turned, the slide is pushed inward and outward. Numbers are enscribed on the housing 83 as best shown in FIG. 1, and when the handle 87 is placed opposite one of these numbers, the photocells 83, 84 are positioned in registry with one of the channels of the micro-film spots 23, 24.

Lamp carrier 76 is linked to a lever 91 which pivots about a vertical pivot 92. The end of lever 91 is connected by an adjustable link 93 to lamp carrier 76. The lever 91 extends exteriorly of the machine and has a handle which engages the arcuate guide 96 mounted on the side of lower holder 61. By means of handle 94 the lever 91 may be locked in position on guide 96. Movement of lever 91 about pivot point 92 advances or retards the timing of the machine by affecting the position of the aperture 78 relative to aperture 62.

In use of the device, a reel of micro-film 21 or other film is mounted on spindles 17 and threaded through the machine to a takeup reel mounted on spindles 41, 43 by lifting the upper holder 63 about is hinge 66 and also by lifting handle 31 to permit separation of the rollers 26, 38.

The handle 87 is then turned to the particular channel which is to be sensed. By electrical means the motor 47 is started in fast speed direction and this causes the spindle 43 to turn the takeup reel rapidly and thus to feed the film 41 from left to right as viewed in FIG. 1. When the light from lamp 77 passing through aperture 78 is obstructed by one of spots 23 on film 21 (or one of the additional spots 24 depending upon the selected channel arising from location of handle 87) one of the photocells 73 is affected thereby an an electrical circuit causes the motor 47 to stop and to reverse. Reversal of the motor 47 by reason of the presence of clutches 49, 51 causes a slow speed movement of film 21. When the photocell 73, which is accurately centered relative to aperture 62 senses the particular spot, the motor 47 is stopped. Thereupon by timing means which forms no part of the present invention, an exposure lamp is pre-illuminated or a shutter therefor is opened for a preselected period of time exposing the frame 22 through aperture 62 onto the object to be exposed.

When it is necessary to adjust the timing of the device because of inaccurate positioning of the frame 22, handle 94 may be moved about the arcuate guide 96 to effect the longitudinal position of the photocells 73, 74.

Figure 8:
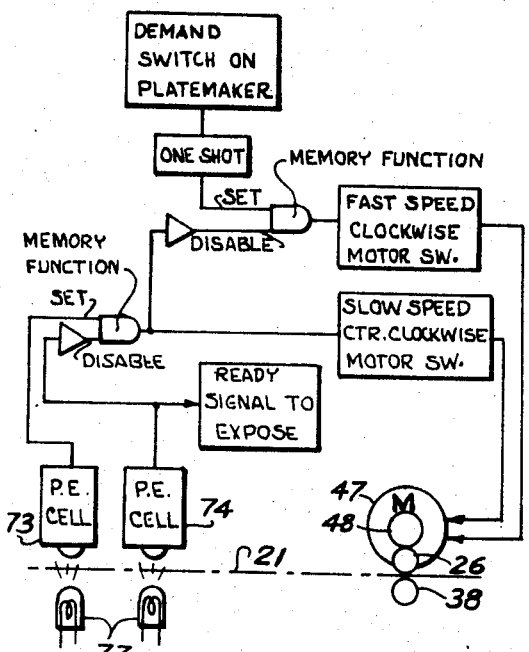
FIG. 8 is a schematic block diagram of the motor control.
Figure 4:
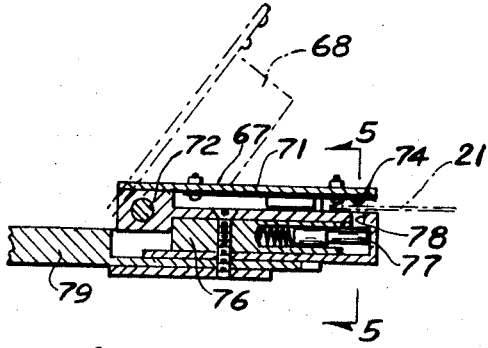
FIG. 4 is an enlarged sectional view taken substantially along the line 4—4 of FIG. 1.

Referring to FIG. 8, a demand switch on the platemaker starts motor 47 in one direction and this drives film roll 38 at fast speed. When a spot 23 activates cell 73, the fast speed motor control is disabled and the slow speed control causes motor 47 to reverse and to drive roll 38 at slow speed. When a spot 23 activates cell 74, the motor is stopped and a signal is given to expose the frame. This causes a timing cycle to be initiated which feeds a plate (e.g.) into the exposure bed below the enlarger, times the exposure and then moves the plate off the exposure bed. One means for accomplishing these functions is shown in Ser. No. 18,421.

It will be understood that instead of conventional silver film other web materials such as diazo, thermo and other vesicular films may be used. Additionally, besides electrostatic plate and print production, the transport may be used in connection with production of other products. Typical examples are electrostatically charged paper, wood and plastic, all either precoated or uncoated which are direct image sensitive. Also the transport may be used to expose photosensitive films such as silver film, silver coated paper, silver-coated direct image plate materials and other types of direct image plates. Metal plats, which are later etched or otherwise processed may be produced. Printed circuit boards and micro circuit devices may be produced. When the word "film" is used in the accompanying claims it will be understood that the term is intended to have a broad meaning as above defined including silver microfilm and other materials, such as diazo, thermo and other vesicular films, and, further, that the transport may be used for purposes other than manufacture of electrostatic plates and prints.

What is claimed is:

1. In a film transport, a main frame, first means for mounting an input reel on one side of said frame, second means for mounting a takeup reel on the other side of said frame, a film drive for pulling film from said input reel, an electric motor, a gear train for driving said film drive from said motor, an exposure section between said first and second means having aligned first and second apertures and means for guiding film between said apertures as said film is moved by said film drive, a lamp, a light proof holder for said lamp having a third aperture positioned at the edge of said first aperture and positioned to pass light from said lamp through the edge of film positioned in said exposure section on one side of said first aperture, a photocell holder carrying a photocell in registry with said third apertures on the side of film passing through said exposure section opposite said holder, and electrical means actuated by said photocell for controlling said motor for first slowing and then stopping driving of said film when a locating spot on said film interrupts transmission of light from said lamp to said photocell.

2. In a film transport, a main frame, first means for mounting an input reel on one side of said frame, second means for mounting a takeup reel on the other side of said frame, a film drive for pulling film from said input reel, an electric motor, a gear train for driving said film drive from said motor, an exposure section between said first and second means having aligned first and second apertures and means for guiding film between said apertures as said film is moved by said film drive, a lamp, a light proof holder for said lamp having a third aperture positioned at the edge of said first aperture and positioned to pass light from said lamp through the edge of film positioned in said exposure section on one side of said first aperture, a photocell holder carrying a photocell in registry with said third aperture on the side of film passing through said exposure section opposite said holder, electrical means for stopping said motor when a locating spot on said film interrupts transmission of light from said lamp to said photocell, a slide mounted for transverse movement in said exposure section, and an adjustment control for moving said photocell and lamp to different positions relative to the edge of said first aperture, said holder mounted on the inner end of said slide, whereby said photocell senses locating spots on said film at different distances from the edge of said film.

3. In a film transport, a main frame, first means for mounting an input reel on one side of said frame, second means for mounting a takeup reel on the other side of said frame, a film drive for pulling film from said input reel, an electric motor, a gear train for driving said film drive from said motor, an exposure section between said first and second means having aligned first and second apertures and means for guiding film between said apertures as said film is moved by said film drive, a lamp, a light proof holder for said lamp having a third aperture positioned at the edge of said first aperture and positioned to pass light from said lamp through the edge of film positioned in said exposure section on one side of said first aperture, a photocell holder carrying a photocell in registry with said third aperture on the side of film passing through said exposure section opposite said holder, electrical means for stopping said motor when a locating spot on said film interrupts transmission of light from said lamp to said photocell, a lever connected to said holder and manually actuated means for moving said lever to move said holder relative to said first aperture parallel to the direction of film movement.

4. In a film transport, a main frame, first means for mounting an input reel on one side of said frame, second means for mounting a takeup reel on the other side of said frame, a film drive for pulling film from said input reel, an electric motor, a gear train for driving said film drive from said motor, an exposure section between said first and second means having aligned first and second apertures and means for guiding film between said apertures as said film is moved by said film drive, a lamp, a light proof holder for said lamp having a third aperture positioned at the edge of said first aperture and positioned to pass light from said lamp through the edge of film positioned in said exposure section on one side of said first aperture, a photocell holder carrying a photocell in registry with said third aperture on the side of film passing through said exposure section opposite said holder, electrical means for stopping said motor when a locating spot on said film interrupts transmission of light from said lamp to said photocell, a second photocell adjacent said first-mentioned photocell and spaced therefrom in the direction of movement of said film, and electrical means controlled by said second photocell to change the speed of movement of said film drive to slow speed when illumination of said second photocell is interrupted by said locating spot, whereby said second photocell senses said spot and slows film movement and said first-mentioned photocell senses said spot to accurately stop said film relative to said first aperture.

5. A transport according to claim 4 in which said motor is reversible and which further comprises a pair of one-direction clutches in said gear train, said second photocell reversing said motor and said clutches slowing rotation of sad film drive.

6. In a film transport, a main frame, first means for mounting an input reel on one side of said frame, second means for mounting a takeup reel on the other side of said frame, a film drive for pulling film from said input reel, an electric motor, a gear train for driving said film drive from said motor, an exposure section between said first and second means having aligned first and second apertures and means for guiding film between said apertures as said film is moved by said film drive, a lamp, a light proof holder for said lamp having a third aperture positioned at the edge of said first aperture and positioned to pass light from said lamp through the edge of film positioned in said exposure section on one side of said first aperture, a photocell holder carrying a photocell in registry with said third aperture on the side of film passing through said exposure section opposite said holder, electrical means for stopping said motor when a locating spot on said film interrupts transmission of light from said lamp to said photocell, a first shaft driven by said gear train and carrying a first roller to engage one side of said film, a yoke pivotally mounted to said second means, a second shaft rotatable in said yoke carrying a second roller in registry with said first roller on the opposite side of said film and resilient means biasing said rollers together.

* * * * *